United States Patent [19]

Furr

[11] Patent Number: 5,315,291

[45] Date of Patent: May 24, 1994

[54] LEAK DETECTION DEVICE

[76] Inventor: Mark A. Furr, P.O. Box 1393, Derry, N.H. 03038

[21] Appl. No.: 996,098

[22] Filed: Dec. 23, 1992

Related U.S. Application Data

[63] Continuation-in-part of Ser. No. 830,937, Feb. 4, 1992.

[51] Int. Cl.$^5$ .............................................. G08B 21/00
[52] U.S. Cl. .................................... 340/605; 340/604; 200/61.05
[58] Field of Search ............... 340/604, 605, 618, 620; 200/61.04, 61.05; 73/40

[56] References Cited

U.S. PATENT DOCUMENTS

| | | | |
|---|---|---|---|
| 4,126,857 | 11/1978 | Lancia | 340/620 |
| 4,297,686 | 10/1981 | Tom | 340/604 |
| 4,845,472 | 7/1989 | Gordon et al. | 340/604 X |
| 4,876,530 | 10/1989 | Hill et al. | 340/605 |
| 5,188,143 | 2/1993 | Krebs | 200/61.04 |

Primary Examiner—Jeffery A. Hofsass
Attorney, Agent, or Firm—William B. Ritchie

[57] ABSTRACT

A leak detection device for preventing damage from leaking hot water tanks. The invention features a unique three layered sensor that completely encircles the hot water tank thus detecting the occurrence of leaks any where around the tank. Circuitry controls the sensor that provides for accurate detection of even small amounts of moisture so that any potential leak problems can be remedied before a major spill occurs. The device is powered by connecting it to 110 house current. A 9 volt battery is provided for battery operation of the device and is also provided a back-up in case of power failures.

6 Claims, 4 Drawing Sheets

LEAK DETECTION DEVICE

This application is a continuation-in-part of U.S. patent application Ser. No. 07/830,937, filed Feb. 4, 1992.

BACKGROUND OF THE INVENTION

1. Field of the Invention

The invention relates to a water leak detection device.

2. Description of Related Art

A long standing problem in the area of containers, particularly hot water tanks, is that if a leak or break were to occur in the tank, no practical means or methods exist for terminating the water input to the tank unless one is physically present at the time the leak initiates. An extended period of leakage may cause substantial damage to carpeting and flooring as well as ceilings, walls and furniture especially if the leak were to occur on an upper floor of a multistory structure. Every year millions of dollars are lost in property damages and lost revenue to businesses due to hot water tank leaks.

U.S. Pat. No. 3,473,553, issued to T. H. Collins, discloses an automatic water cut off heater that requires a build up of water in its leakage reservoir to raise the float switch and activate the solenoid cut off valve. The system by Collins does not provide a means to operate the solenoid valve if a power failure is present during the time of leakage.

U.S. Pat. No. 4,126,857, issued to Lancia et al., discloses a probe-type liquid detector that has a limited area of sensor sensitivity. It utilizes a probe-type sensor that must rely on the leakage from the hot water tank to flow where the sensor is placed. The detector also has a test operation mode that will test the audible alarm of the detector but does not test the sensor circuitry of the detector.

U.S. Pat. No. 4,297,686, issued to Tom, discloses a water detection device with a combined extended probe liquid detection and shut-off system. A solenoid-type shut-off valve is utilized which is unsuitable for long term, unattended applications due to the substantial electrical current drain required. The elongated sensor probe relies on the flexible adhesive tape to keep it in contact with the floor. Adhesive tapes can loose their adhesive properties when exposed to humidity and moisture.

U.S. Pat. No. 4,805,662, issued to Moody, discloses a hot water heater failure protection device with solenoid that senses accumulation of moisture or liquid below the tank, that is, in the so-called drip pan. The device utilizes a ground fault interrupter circuit which for its operation requires that the hot water failure system be continuously powered by a 110 volt alternating current. Accordingly the system presents a potential safety hazard and requires considerable cost in operating power.

U.S. Pat. No. 5,008,650, issued to Hoiberg, discloses the use of an elongated filament like sensor that is placed around the base of the hot water tank. This type of sensor relies on leaking water to rise above its protruding edge and flow over its limitedly exposed electrical conductors to activate the alarm. Since finished floors and cement floors can have high and low areas, the leaking water will take the lowest point of travel and may flow underneath the sensor bypassing the exposed electrical conductors located on the top side of the sensor.

U.S. Pat. No. 5,029,605, issued to Dowling et al., discloses a fluid vessel overflow system that is powered by an external electrical power source and utilizes a solenoid-type valve which will not function in the event of a power failure. The system does not provide an audible alarm or a visual alarm to notify the owner that water is leaking from the vessel. The system also fails to provide a means to trigger externally located alarm accessories and home security and protection systems.

A system that automatically detects leaks, activates an alarm in the building or at some other location and has a floor contouring sensor that completely encircles the hot water tank is not found in prior art.

SUMMARY OF THE INVENTION

It is an object of the invention to provide a leak detection device to detect the leakage of water from a hot water tank.

It is another object of the invention to provide a leak detection device that is electrically powered but not hazardous to personnel in the vicinity of the device.

It is still another object of the invention to provide a leak detection device in which the alarm status indication including alarm triggered, alarm set and alarm off is given to the user.

It is still an additional object of the invention to provide a leak detection device that has an audible and visual alarm.

It is still another object of the invention to provide a leak detection device with external monitoring device triggering.

It is still another object of the invention to provide a leak detection device in which low battery power status is given to the user.

It is still another object of the invention to provide a leak detection device with a alarm test mode.

It is still another object of the invention to provide a leak detection device that can be powered by a fused wall adaptor or an internal battery for normal operation or for battery back-up during power failures.

It is still another object of the invention to provide a leak detection device with a sensor that completely encircles the hot water tank.

It is a final object of the invention to provide a leak detection device with a sensor that has sensor elements that conform to the contour of the surface it rest on.

The invention is a leak detection device for liquid containers. It features a ring or "doughnut" design sensor that has two conductive elements. The first conductive element closest to said container is located on the inner ring side of the sensor. The second conductive element is located on the outer ring side of the sensor. The first and second conductive elements cover the lateral sides of the ring and run down to meet, but not touch on the bottom side of the ring sensor. Each of the sensor conductive elements have conductive strips with looped terminations located on the bottom side of the ring sensor. The sensor ring is supported by the looped terminations. Each looped termination has spring like tension that is created by the weight of the sensor ring resting on top of the looped terminations. This spring like tension keeps each conductive sensor strip in contact with the floor insuring floor contoured contact between the sensor and the floor it rests on. The sensor also features detachable ring halves that make installation or removal of the ring sensor easy.

The final feature of the ring sensor is the test button. The test button when pressed provides a short circuit between the two sensor conductive elements, simulating an alarm condition triggering the detector. A leak in said container will cause said sensor to produce a signal corresponding to said leak by completing an electrical circuit through said first and second conductive elements.

DETAILED DESCRIPTION OF THE INVENTION

The present invention is a device for detecting the presence of water, moisture or other electrically conductive liquids that may leak from a tank, particularly a hot water tank. The invention notifies the owner of a hot water tank leak through audibly by buzzer; visually by a flashing light; also by telephone auto-dialer or other external monitoring device. The invention has the following features incorporated into its design; alarm status indication, power source in use indication, low battery indication, external monitoring device triggering, test operation mode, battery or external power source, one year battery operation, and battery backup.

The invention also has the following safety features incorporated into its design; fused external wall adaptor power source and a low electrical current flow for sensor operation.

Figure 1:
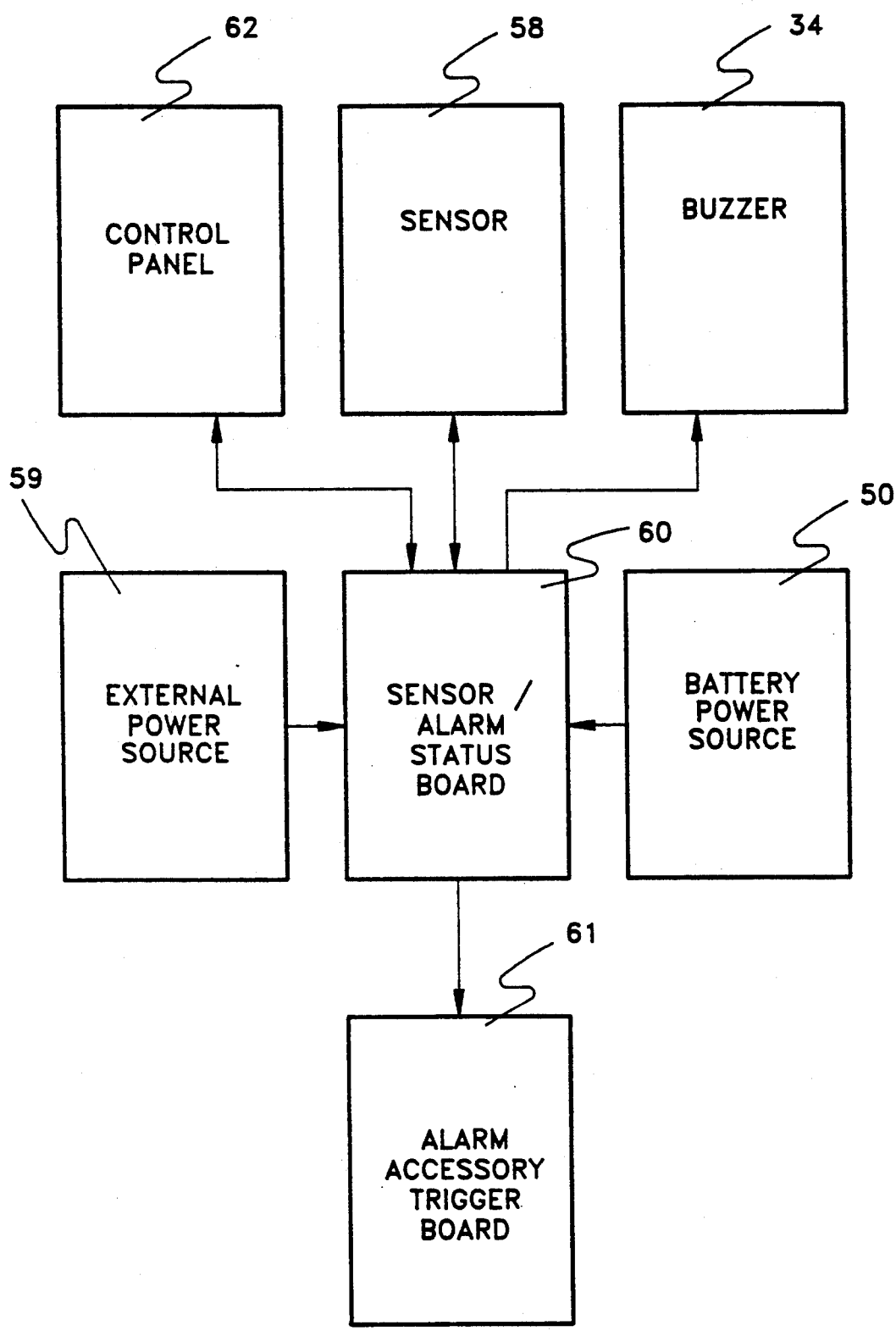
FIG. 1 is a block diagram of the principal component systems of the leak detection device in accordance with the invention.

As shown in the block diagram of FIG. 1, The invention comprises a control panel 62, buzzer 34, sensor 58, external power source 59, sensor/alarm status board 60, battery power source 50 and alarm accessory trigger board 61.

Control panel 62 comprises two switches and two light emitting diodes (LED). One switch controls alarm status and the second switch controls an alarm test function. One LED displays the power source in use and the other displays alarm status and battery voltage status.

Buzzer 34 is a piezo buzzer that provides an audible output of 90 decibels minimum. The function of the buzzer is to provide audible notification of an alarm condition.

The fused external power source 59 provides voltage and current to operate the present invention. This power source provides 12 volts and 0.5 amps of current and is a wall transformer that is fused between the power transformer secondary output and the rectifier circuits. The fuse provides safe operation of the present invention and is provided as a safety precaution in the event of an electrical failure that could cause damage to the hot water tank leak detection device or danger to persons in the vicinity of the invention.

Battery power source 50 is preferably a 9 volt battery. The function of battery power source 50 is to provide voltage and current to the leak detection device during the absence of external power.

Sensor/alarm status board 60 senses an alarm condition and distributes signals to the control panel 62, alarm accessory trigger board 61 and buzzer 34.

Alarm accessory trigger board 61 triggers external alarm monitoring devices and is controlled by the sensor/alarm status board 60.

The moisture sensor 58 is a ring-type sensor that completely encircles the base of a hot water tank, thus providing complete circular surface area coverage of the hot water tank. The moisture sensor comprises a ring or "doughnut" design that has two conductive elements secured to a nonconductive ring assembly. Each conductive element is made of flexible material having a resistance of 0 to 2 megohms. The first conductive element closest to said container is located on the inner ring side of the sensor. The second conductive element is located on the outer ring side of the sensor. The first and second conductive elements cover the lateral sides of the ring and run down to meet, but not touch on the bottom side of the ring sensor.

Each of the sensor conductive elements have conductive strips with looped terminations located on the bottom side of the ring sensor. The sensor ring is supported by the looped terminations. Each looped termination has spring-like tension that is created by the weight of the sensor ring resisting on top of the looped terminations. This spring-like tension keeps each conductive sensor strip in contact with the floor insuring floor contoured contact between the sensor and the floor it rests on. The sensor also comprises detachable ring halves that make installation or removal of the ring sensor easy. Each ring half has one electrical phone-type connectors located at the ends of each assembly. Each phone-type connector is utilized to perform two functions. The first function is to provide an electrical connection between the ring halves of the sensor. The second function is to provide a mechanical connection that keeps the ring halves secured to each other. An electrically conductive two conductor wire having a phone-type plug at each end is connected to the leak detector sensor phone-type jack of the leak detector assembly and the phone type-jack of the sensor assembly. When moisture leaks out of the hot water tank it first comes in contact with the inner ring side conductive element of the sensor. When the moisture comes in contact with the outer ring side conductive element of the sensor the leak detector alarms. This event completes an electrical circuit that runs from the sensor circuit through the phone-type jack of the leak detector assembly and through the phone-type plug to one of the electrically conductive wires of the two conductor wire. The circuit continues through the single conductor of the two conductor wire through the other phone-type plug of the two conductor wire and through the phone-type jack of the moisture sensor to the inner ring side conductive element of the moisture sensor. The circuit now continues through the electrically conductive moisture to the outer most ring side conductive element of the moisture sensor. The circuit continues from the outer most ring side conductive element of the sensor through the phone-type jack of the moisture sensor and the phone-type plug of the two conductor wire to the other single conductor of the two conductor wire. The circuit now continues through the phone-type plug of the two conductor wire and the phone-type jack of the detector assembly to the sensor circuit. This is an alarm condition that will activate the hot water tank leak detector. The ring moisture sensor also comprises a test button. The test button, when pressed, provides a short circuit between the two sensor conductive elements, thus simulating an alarm condition that will activate the hot water tank leak detector.

When high humidity is present at the installation site of the moisture sensor, an alternative circuit path can be set up to prevent false alarm conditions. A conductive material, preferably copper foil, is soldered to one of the pipes that is connected to the hot water tank. An electrically conductive wire is connected from the copper foil to the sensor wire phone-type plug. The phone-type plug is inserted into the sensor phone type jack of the detector assembly. The second wire of that phone-type plug runs to another phone-type plug which is connected to the moisture sensor. When moisture leaks out of the hot water tank it comes in contact with the inner ring side conductive element of the sensor the leak detector alarms. This event completes an electrical circuit that runs from the sensor circuit through the phone-type jack of the leak detector assembly and through the phone-type plug to one of the electrically conductive wires of the two conductor wire which is connected to the copper foil that is soldered to one of the pipes that is connected to the hot water tank. The water pipe is made of copper and it conducts electrical current to the water that is inside of the pipe. This water is electrically conductive and is in contact with the water that is inside of the hot water tank. Electrical current then passes through the leaking hole of the hot water tank and out to the inner ring side conductive element of the moisture sensor. The circuit continues from the inner most ring side conductive element of the sensor through the phone-type jack of the moisture sensor and the phone-type plug of the two conductor wire to the other single conductor of the two conductor wire. The circuit now continues through the phone-type plug of the two conductor wire and the phone-type jack of the detector assembly to the sensor circuit. This is an alarm condition that will activate the hot water tank leak detector. The ring moisture sensor also comprises a test button. The test button when pressed provides a short circuit between the two sensor conductive elements, thus simulating an alarm condition that will activate the hot water tank leak detector.

Figure 2:
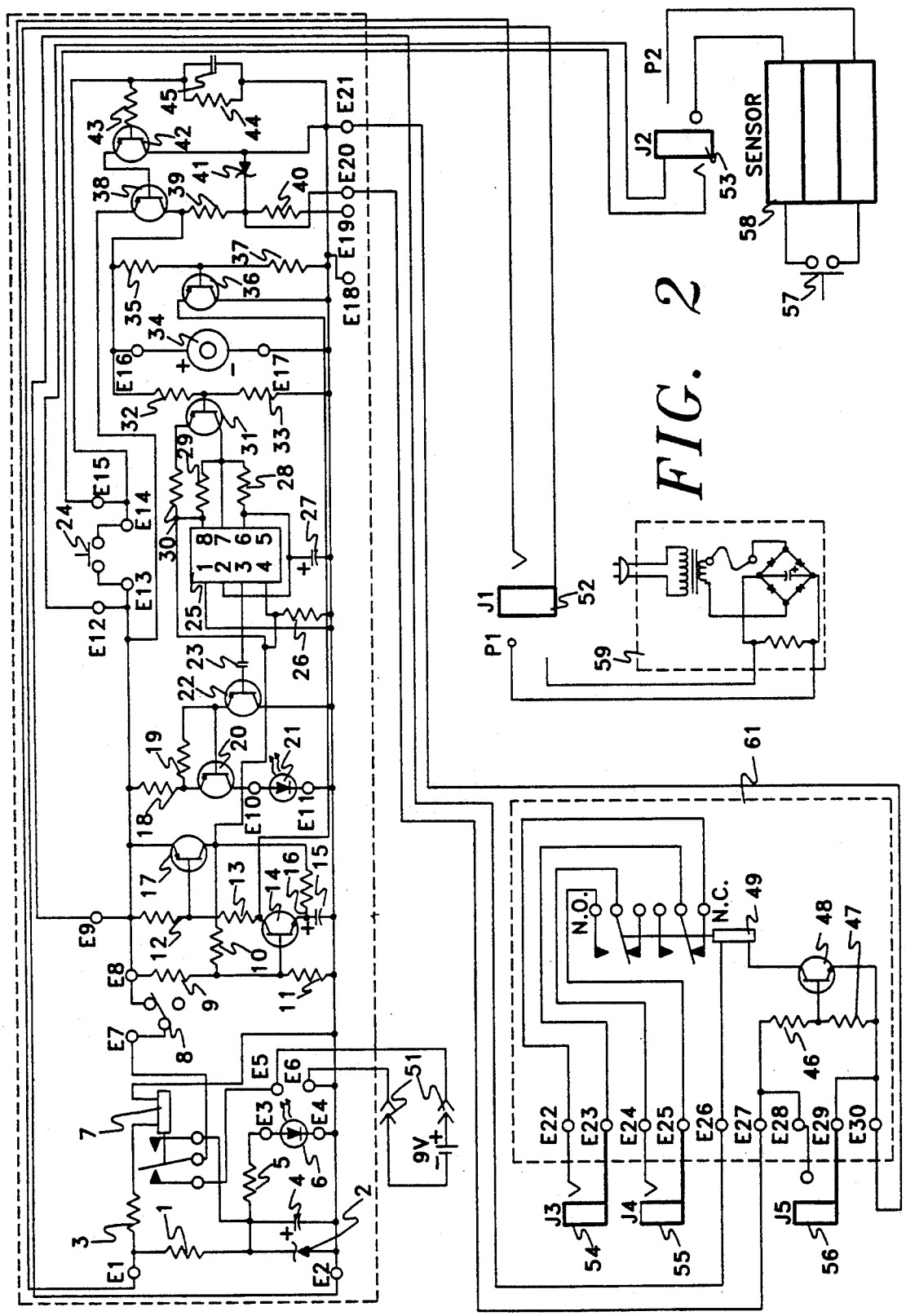
FIG. 2 is a schematic that details the electronic circuitry of the leak detection device in accordance with the invention.

FIG. 2 is a schematic that details the electronic circuitry of the leak detection device in accordance with the invention. The sensor/alarm status board 60 comprises elements 1 through 45. The power source regulator circuit consists of resistor 1, zener diode 2 and capacitor 4. Resistor 1, preferably 100 ohms, ¼ watt, limits the current flow to zener diode 2, part no. 1N4739, thus protecting it from exceeding the maximum current flow limit of the component. Zener diode 2 regulates the voltage supplied to all of the circuits of the sensor/alarm status board 60 except resistor 3, 220 ohms, ¼ watt and relay 7, 12 volts, SPDT. The function of capacitor 4, 220 microfarad, electrolytic type, is to suppress voltage ripple and other spurious AC voltages that may be caused by the loading of the wall adaptor 59, 12 volts DC, 0.5 amps.

The power source switching circuit consist of resistor 3 and relay 7. Resistor 3 limits the current flow and voltage to relay 7. Relay 7 directs current and voltage from two sources and connects the sources to the status board 60 during wall transformer adapter or battery operation of the alarm.

The power source visual indicator circuit consists of resistor 5, 1 Kohms, ¼ watt and LED 6, green. Resistor 5 limits the current flow to LED 6. LED 6 is located on control panel 62 and illuminates indicating that wall transformer 59 is supplying voltage and current. If wall transformer 59 is not supplying voltage and current LED 6 will not be illuminated. This condition will indicate that battery power source 50 is supplying the power for the invention to operate.

The power source on/off circuit is accomplished by switch 8, SPDT. Switch 8 is located on control panel 62. As shown in FIG. 2, the low current drain multivibrator circuit comprises elements 9 through 17. Resistor 9, 10 Megohms, ¼ watt, resistor 10, 10 Megohms, ¼ watt and resistor 11, 10 Megohms, ¼ watt, are biasing resistors for transistor 14, part no. 2N3904. Resistor 12, 470 Kohms, ¼ watt and resistor 13, 47 Kohms provide DC biasing for transistor 17, part no. 2N3906. Capacitor 15, 47 microfarad, electrolytic, is a timing capacitor. When the voltage present at the emitter of transistor 14, is 0.7 volts or more lower than the voltage present at the base of transistor 14, current flows to capacitor 15, charging it. During this 2.5 second charging period, current flows through 17 which supplies voltage and current to resistor 10, 10 Megohms, ¼ watt, resistor 16, 220 Kohms, ¼ watt and elements 25 through 30. When capacitor 15 is charged to 0.7 volts below the voltage present at the base of transistor 14 or higher, current stops flowing through transistor 14 to capacitor 15. Transistor 17 stops providing voltage and current to resistors 10 and 16 and elements 25 through 30 at this time. Capacitor 15 starts to discharge at this time through resistor 16 and IC 25, TLC555 to voltage supply (−). This discharge time of capacitor 15 takes 10 seconds. Resistors 16 and 13 determine the charging time for capacitor 15 and resistor 16 determines the discharge time for capacitor 15. Resistors 9, 10 and 11 determine the current draw of the low current draw multivibrator circuit when no voltage or current is supplied to elements 25 through 30 and have been selected to draw less than 1 microamp to conserve battery voltage during battery operation of the alarm. The function of the low current drain multivibrator circuit is to supply voltage and current to elements 25 through 30 for 2.5 seconds at an interval of 10 seconds.

As shown in FIG. 2, the alarm status visual indicator circuit comprises elements 18 through 23 and 25 through 33. Integrated circuit timer IC 25, part no. TLC555, is externally configured to oscillate at two frequencies. Resistor 28, 2.2 Kohms, ¼ watt, resistor 29, 47 Kohms, ¼ watt and resistor 30, 1 Kohm, ¼ watt are timing resistors for IC 25. Capacitor 27, 47 microfarad, electrolytic, is a timing capacitor for IC 25. Resistors 28, 29, 30 and capacitor 27 determine the frequency and duty cycle produced by lead #3 of IC 25. Resistors 28, 29 and capacitor 27 determine frequency "A" and its duty cycle during alarm set operation. Frequency "A" ON time is set to 1.84 seconds with an OFF time of 80 milliseconds. The ON time voltage is 90% of the voltage amplitude supplied to IC 25 and the OFF time voltage amplitude is 0 volts. With frequency "A" set in this configuration the initial charge time of capacitor 27 is 2.9 seconds. Since the low current drain multivibrator circuit only provides voltage and current to IC 25 for only 2.5 seconds, the output voltage of IC 25 lead #3 does not oscillate and follows the output voltage pattern of the low current drain multivibrator, which has an output voltage ON time of 2.5 seconds and an output voltage OFF time of 10 seconds.

When the alarm triggered condition exists, transistor 31, part no. 2N3904, provides a current path that makes resistors 29 and 30 a parallel resistor pair. This condition changes the frequency and duty cycle present at IC 25, lead #3. Frequency "B" is set by this condition. Frequency "B" ON time is 100 milliseconds with an OFF time of 100 milliseconds. Capacitor 23, 0.047 microfarad, ceramic disc, is charged and discharged by IC 25, lead #3. When capacitor 23 is discharged the base of transistor 22, part no. 2N3906, is provided with an AC type voltage and current biasing characteristic. This condition allows current to flow from the emitter of transistor 22 to the collector of transistor 22 which is connected to voltage supply (−). The base of transistor 20, part no. 2N3906, is connected to the emitter of transistor 22 and is provided with a current path to voltage supply (−) through transistor 22. Current flows from the emitter of transistor 20 to the collector of transistor 20 under this condition. The current from the collector of transistor 20 flows through LED 21, clear red light, which is located on control panel 62. LED 21 illuminates under this condition. The brightness and duration of the illumination of LED 21 is determined by the capacitance of capacitor 23, 0.047 microfarad, ceramic disc type. During battery operation of the alarm, if the output voltage present at IC 25 part no. TLC555 lead #3 is too low LED 21, clear red light, will not illuminate. This condition will indicate that the battery is not providing sufficient voltage and should be replaced with a new battery. Resistor 18, 10 ohms, ¼ watt, limits the current flow through transistor 20, part no. 2N3906. Resistor 19, 22 Kohms, ¼ watt, supplies the voltage and current required to bias the base of transistor 20 when transistor 22 provides a current path to voltage supply (−) which permits current to flow through LED 21. Resistors 32, 1 Kohm, ¼ watt and 33, 220 Kohms, ¼ watt, provide DC biasing for transistor 31, part no. 2N3904, in the alarm triggered condition and transistor 31 provides a current path from resistor 30, 1 Kohm, ¼ watt, to resistor 29, 47 Kohms, ¼ watt, which makes resistor 29 and resistor 30 a parallel resistor pair. This condition changes the output frequency of IC 25, lead #3. Resistor 26, 47 Kohms, ¼ watt, provides a voltage drop to voltage supply (−) which maintains a constant voltage at lead #4 of IC 25.

The sensor circuit comprises elements 38, 53, 57, 58 and 42 through 45. The function of resistor 44, 1 Megohm, ¼ watt, and capacitor 45, 0.047 microfarad, ceramic disc type, is to suppress voltage ripple and other spurious AC voltages including external sources that could cause false biasing of transistor 42, part no. 2N3904. Resistor 43, 1 Megohm, ¼ watt, sets the DC biasing current and sensitivity of transistor 42. Moisture sensor 58 as previously described has two conductive elements. When moisture leaks from inside of the hot water tank wetting the two conductive sensor elements a maximum current flow of 18 microamps flows from E12 to sensor 58 and through the conductive path created by the leaking moisture and back to E15. E15 is connected to resistors 43, 44 and capacitor 45. The base of transistor 42 is DC biased by the current flow from E15. This condition permits current to flow from the emitter of transistor 38, part no. 2N3906, to the collector of transistor 42 and from the emitter of transistor 38 to the collector of transistor 38. This condition permits voltage and current to flow from the collector of transistor 38 to the low current drain multivibrator override circuit, alarm status visual indicator circuit, alarm status audio indicator circuit and the external trigger circuit.

Test switch 57, SPST, momentary, normally open when pressed provides a short circuit between the two conductive sensor elements simulating a leak condition at moisture sensor 58. This condition also permits voltage and current to flow from the collector of transistor 38 to the low current drain multivibrator override circuit, alarm status visual indicator circuit, alarm status audio indicator circuit and the external trigger circuit.

Figure 3:
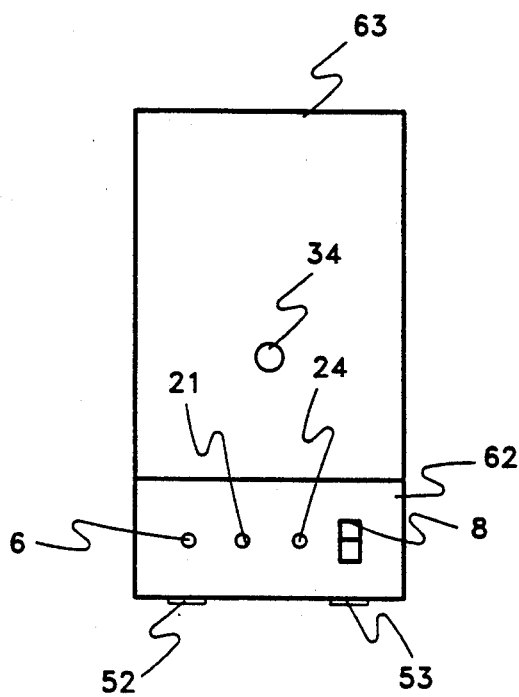
FIG. 3 is a detailed view of the leak detector assembly of the invention.

The alarm status audio indicator circuit is piezo buzzer 34, pulsating, 2800 Hz, 95 db. Buzzer 34 is activated by the flow of current from the collector of transistor 38 and produces a pulsating audio output at 95 decibels. Buzzer 34 is mounted inside of the leak detector assembly 63 as shown in FIG. 3.

The low current drain multivibrator override circuit comprises resistor 35, 47 Kohms, ¼ watt, resistor 37, the same value as 35 and transistor 36, part no. 2N3904. Resistors 35 and 37 are biasing resistors for transistor 36. When current flows from the collector of transistor 38, the base of transistor 36 is DC biased and current flows from the collector of transistor 14, 2N3904, to the collector of transistor 36 to voltage supply (−) through the emitter of transistor 36. The base of transistor 17, 2N3906, is provided with DC biasing through this path. The low current multivibrator circuit will provide constant volt and current to elements 18 through 30 as long as this condition is present.

The external trigger output circuit comprises resistors 39, 2.2 Kohms, ¼ watt, 40, 1 Kohm, ¼ watt and zener diode 41, part no. 1N4733. Resistor 39 is a current limiting resistor for zener diode 41. Resistor 40 is a biasing resistor that is utilized to trigger input transistors located on other types of circuit boards that may be added to the present invention to perform functions that have not been defined at this time. When current flows from the collector of transistor 38, the external trigger output circuit supplies voltage and current to trigger the alarm accessory trigger board 61 into operation.

The alarm test circuit utilizes switch 24, SPST, momentary, normally open, which is located on control panel 62. When switch 24 is placed in the closed position and released, a hot water tank leak condition is simulated. This condition activates the leak detector.

The battery power source comprises battery 50, 9 volts DC and connector 51, snap-type. Voltage and current are supplied to all of the leak detection device circuits through connector 51 and E5 and E6. This circuit supplies voltage and current only when wall transformer adapter 59 fails to supply voltage and current or when battery powered operation of the leak detection device is selected.

The alarm accessory trigger circuit board 61 comprises elements 46 through 49 and 54 through 56. Resistor 46, 22 Kohms, ¼ watt and resistor 47, 22 Kohms, ¼ watt are biasing resistors for transistor 48, part no. 2N3904. Relay 49, DPDT is a 12 volt DC relay. When the hot water tank leak detector is triggered into the alarm condition, voltage and current are applied to resistor 46 from the external trigger circuit located on the sensor/alarm status board 60. This event will make transistor 48 provide relay 49 with a current path to voltage supply (−). The normally closed and normally open contacts of relay 49 will change position at this time. Any external alarm monitoring device which is connected to relay 49 through connectors 54 and 55 will be triggered into operation by this change of relay contact position. The external trigger circuit of the sensor/alarm status board 60 supplies 5 volts DC to connector 56 through terminals E28 and E29 during an alarm condition. This voltage can also be used to trigger an external alarm monitoring device.

As shown in FIG. 3, the leak detection assembly 63 exhibits control panel 62, buzzer 34, external power source input connector 52 and moisture sensor input connector 53. Control panel 62 controls all electrical functions and displays conditions for alarm status OFF, SET or TRIGGERED. The arrangement of control panel 62 alarm Test switch 24, alarm SET/OFF switch 8, alarm status LED 21 and power source in use LED 6 can also be observed.

Figure 4:
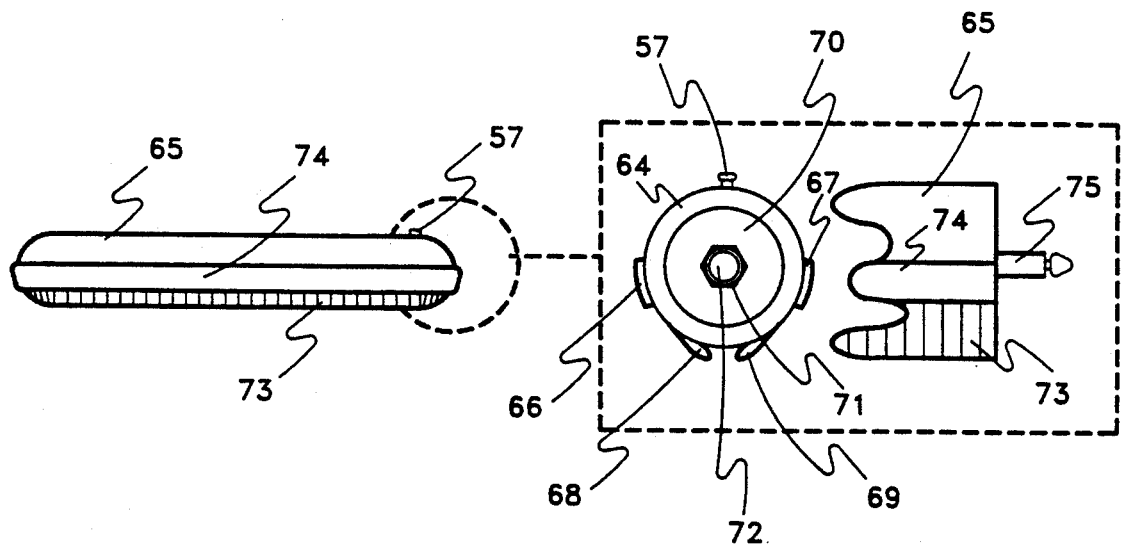
FIG. 4 is a detailed view of the moisture sensor assembly of the invention.

As shown in FIG. 4, the moisture sensor assembly 58 comprises element 57 and elements 64 thru 75. It is a ring-type sensor that completely encircles the base of a hot water tank, thus providing complete circular surface area coverage of the hot water tank. The moisture sensor comprises a ring or "doughnut" design that has two detachable ring halves, elements 64 and 65. Elements 64 and 65 are electrically nonconductive and can be made of nylon, PVC or injection formed plastics. Elements 68, 69 and 73 are electrically conductive moisture sensor elements. Each conductive element is made of flexible material having a resistance of 0 to 2 Megohms. Elements 68, 69 and 73 can be made of 3M (R) electrically conductive plastic or any other material that is electrically conductive and flexible. The first conductive element 68, closest to said container is located on the inner ring side of the sensor. The second conductive element 69, is located on the outer ring side of the sensor. The first and second conductive elements 68 and 69 cover the lateral sides of the ring and run down to meet, but not touch on the bottom side of the ring sensor. Sensor conductive elements 68 and 69 have conductive strips with looped terminations located on the bottom side ring sensor half 64. Sensor ring half 64 is supported by the looped terminations. Each looped termination has spring like tension that is created by the weight of sensor ring half 64 resting on top of the looped terminations. This spring like tension keeps each conductive sensor strip in contact with the floor insuring floor contoured contact between the sensor and the floor it rests on.

Elements 66 and 67 are straps that are utilized to secure conductive sensor elements 68 and 69 to ring half 64. These straps have bullet shaped pins that project into receptacle holes located along the lateral sides of the ring half 64. These straps can be made of nylon, PVC, or injection formed plastics. Strap elements 66 and 67 can be secured to ring half 64 by the snap or interlocking design of the bullet pins and receptacle holes or by the use of glues, epoxies, cements or any other bonding material that will maintain a bond under the environmental conditions that may exist where hot water tanks are located. Moisture sensor ring halves 64 and 65 are detachable ring halves that make installation or removal of the ring sensor easy. Each ring half has one electrical phone-type connectors located at the ends of each assembly, one phone-type plug and one phone-type jack. Phone type plug 75 and phone-type jack 72 are utilized to perform two functions. The first function is to provide an electrical connection between the ring halves 64 and 65 of the sensor. The second function is to provide a mechanical connection that keeps ring halves 64 and 65 secured to each other. Element 70 is a disc-type mounting plate for phone-type jack connector 72. It can be made of nylon, PVC or injection formed plastic. Phone-type jack connector 72 is secured to mounting plate 70 by nut 71. Mounting plate 70 is secured to sensor ring half 64 by the use of glues, epoxies, cements or any other bonding material that will maintain a bond under the environmental conditions that may exist where hot water tanks are located. Test switch 57, SPST, momentary, normally open, is utilized to simulate a hot water tank leak condition. When test switch 57 is pressed it provides a short circuit between sensor conductive elements 68 and 69 thus simulating the presence of conductive moisture between sensor elements 68 and 69. This condition triggers the leak detection device into alarm condition action.

Figure 5:
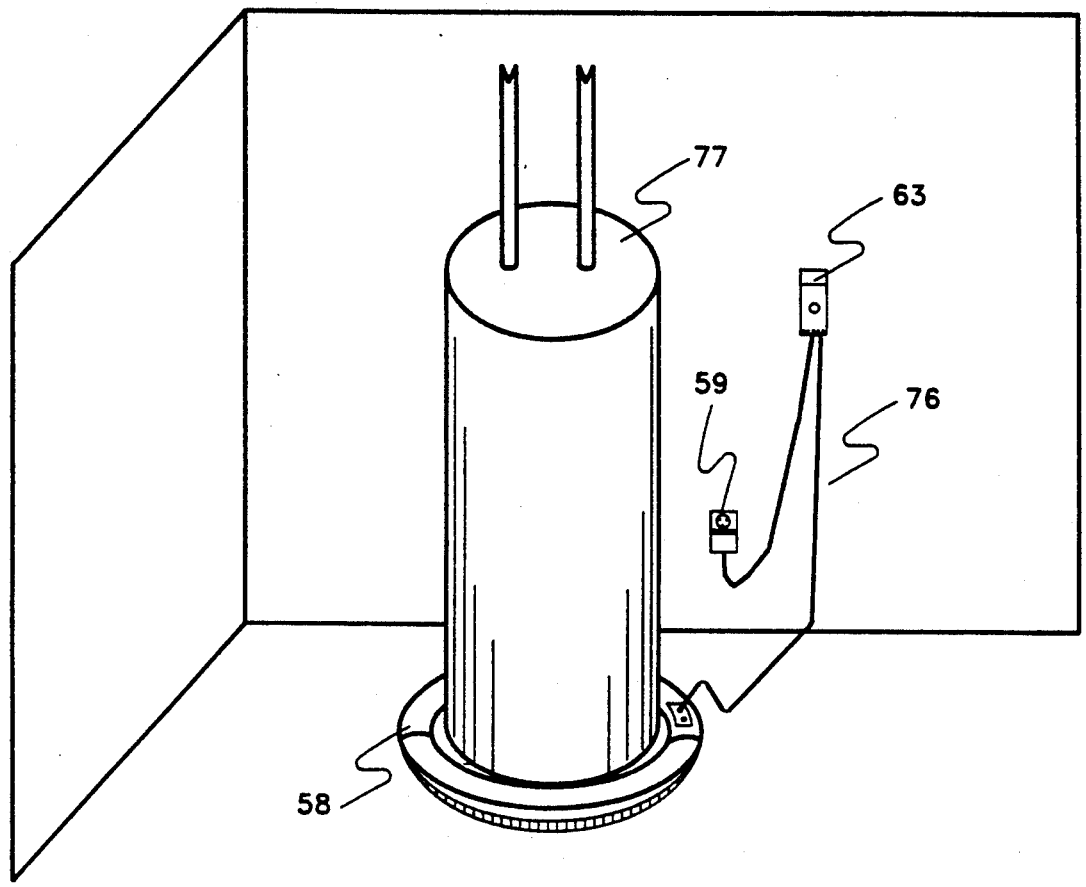
FIG. 5 shows the invention placed in a typical hot water tank environment.

As shown in FIG. 5, the invention is placed in a typical hot water tank environment. Detector assembly 63 is mounted on a wall that is near the location of hot water tank 77. Wall adapter 59 is plugged into an electrical power outlet that is located adjacent to hot water tank 77. This adapter provides electrical power to operate the present invention. Moisture sensor assembly 58 as shown in FIG. 5, is placed on the floor and encircles hot water tank 77. Moisture sensor assembly 58 is electrically connected to detector assembly 63 by sensor wire 76.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A leak detection device for a liquid container comprising:

a three layer sensor, having two detachable ring halves, dimensioned to encircle said liquid container, said sensor having a first layer, closest to said container, flexible and conductive, having a resistance ranging from 0 to 2 megohms, said sensor having a second layer, furthest from said container, flexible and conductive, having a resistance ranging from 0 to 2 megohms, and said sensor having a third layer, sandwiched between said first and second layers, said third layer nonconductive, wherein a leak in said container will cause the sensor to produce a signal corresponding to said leak by completing an electrical circuit through said first and second layers; and wherein said sensor further comprises flexible and conductive strips with looped terminations, said looped terminations physically support said sensor and substantially conform to the contour of the surface said sensor rests on.

2. The leak detection device of claim 1 further comprises:

warning means for announcing that said container has developed a leak;

control means for processing the signal produced by said sensor to activate said warning means.

3. The leak detection device of claim 2 wherein said warning means further comprises a piezo buzzer, wired to said control means, wherein said leak in said container, causes said buzzer to be activated producing an audible warning of at least 95 decibels.

4. The leak detection device of claim 3 wherein said warning means further comprises telephone dialing means, connected to said control means, for automatically dialing a pre-selected telephone number in response to the detection of a leak by said sensor.

5. The leak detection device of claim 4 wherein said warning means further comprises a flashing light.

6. The leak detection device of claim 5 wherein said control means further comprises:

a power source indicator which indicates when battery power has replaced line current as the power source;

a low battery indication which indicates that the battery should be replaced; and a test operation mode which simulates a leak in said container to test the operation of said leak detection device.

* * * * *